US010063328B1

(12) United States Patent
Brinkoetter (10) Patent No.: US 10,063,328 B1
(45) Date of Patent: Aug. 28, 2018

(54) RF ANTENNA SUPPORTED ON A DRONE

(71) Applicant: Thomas R. Brinkoetter, Reno, NV (US)

(72) Inventor: Thomas R. Brinkoetter, Reno, NV (US)

(*) Notice: Subject to any disclaimer, the term of this patent is extended or adjusted under 35 U.S.C. 154(b) by 22 days.

(21) Appl. No.: 15/608,877

(22) Filed: May 30, 2017

Related U.S. Application Data

(60) Provisional application No. 62/483,638, filed on Apr. 10, 2017.

(51) Int. Cl.
*H04B 17/18* (2015.01)
*B64C 27/00* (2006.01)

(52) U.S. Cl.
CPC .......... *H04B 17/18* (2015.01); *B64C 27/006* (2013.01); *B64C 2201/027* (2013.01); *B64C 2201/12* (2013.01)

(58) Field of Classification Search
CPC ..... H04B 17/18; B64C 27/00; B64C 2201/12; B64C 2201/027
See application file for complete search history.

(56) References Cited

U.S. PATENT DOCUMENTS

| | | | | |
|---|---|---|---|---|
| 2012/0065946 A1* | 3/2012 | Brown | ............. | H01Q 1/00 703/1 |
| 2014/0062823 A1* | 3/2014 | Shor | ............. | H01Q 9/0421 343/816 |
| 2016/0376031 A1* | 12/2016 | Michalski | ............. | B64F 1/36 701/15 |
| 2017/0005529 A1* | 1/2017 | Burling | ............. | H01P 3/165 |

OTHER PUBLICATIONS

Photograph of DJI Matrice 600 Pro industrial drone, acknowledged by applicant as prior art, 1 page.
Phantom 4 consumer drone, print of DJI.com website, 3 pages.

* cited by examiner

*Primary Examiner* — Frantz Bataille
(74) *Attorney, Agent, or Firm* — Thomas M. Freiburger (57) ABSTRACT

A small consumer drone is used to measure RF signals, such as within the vicinity of a cell tower. The drone's frame is fitted with an antenna support device which can be in the form of two intersecting arches of dielectric material. An antenna of selected specification is secured to the antenna support. In this way, the antenna support not only provides a secure mounting for the antenna, but also provides protection from objects above the drone.

3 Claims, 6 Drawing Sheets

RF ANTENNA SUPPORTED ON A DRONE

This application claims benefit of provisional application No. 62/483,638, filed Apr. 10, 2017.

BACKGROUND OF THE INVENTION

The invention concerns small unmanned aircraft systems (sUAS) or drones used to investigate cell towers. More particularly the invention is directed at antenna systems for such drones, for investigating signal strength of RF signals in the vicinity of cell towers.

Drones, especially industrial drones, have been used for sensing strength of RF signals, by attachment of an antenna of specific configuration to the drone via relatively large, upwardly extending angled struts secured to the drone's frame. The industrial drones, usually weighing at least five pounds, are configured for attaching equipment to the upper side, with mounting facilities and usually flat areas, and they are capable of carrying a significant load. The large drone, with signal processing electronics onboard, is flown through the region of interest. More accurate readings can be obtained from above, without the obstruction of buildings, trees, or other vegetation and structures. Drones of various sizes have also been used to inspect cell towers by taking photographs or videos. Consumer drones typically have cameras mounted on their bottom sides.

There has not been a reliable, practical, lightweight, rugged and economical apparatus or system for retaining an antenna of needed configuration on a small drone or sUAS, i.e. a consumer drone, typically weighing three to four pounds (and costing far less than an industrial drone). This is true particularly for measuring signals around cellular phone towers using a consumer drone, where an antenna must be of particular configuration and size, and the consumer drone lacking any means of attachment or mounting structures to secure an antenna or antenna support structure.

SUMMARY OF THE INVENTION

The invention provides a method and apparatus to mount any of several test antennas or a smartphone or other small equipment on a drone or sUAS, so as not to interfere with the RF performance of the test antenna, not to add significant weight, and not to make difficult the landing of the drone. The invention offers flexibility for mounting different types of antennas on a drone, for a variety of test scenarios.

A typical consumer drone, with a weight of about 3 to 4 pounds, can fly for about fifteen minutes with an added load of about 1.5 pounds. The antenna support apparatus of the invention weighs only about 3 ounces. A smartphone (i.e. an iPhone or Android) in a normal size, weighs about 4.8 ounces. The equipment of the invention added to a drone, including an antenna and a smartphone, can add about 8 to 10 ounces to the drone. With this added weight a typical consumer drone as noted above can fly for about twenty minutes.

Commercial/industrial drones, typically 5 pounds or considerably more in weight, are made to lift far more weight.

In a preferred embodiment the invention includes an antenna support comprising a superstructure to be positioned on and secured to the top side of the drone. In one form this antenna support structure takes the form of two intersecting arches of dielectric material, preferably arching plastic bars or rods. Each of these arches has at each end a horizontal crossbar or brace in a "T" configuration with the end of the arch. The ends of the bar or brace are secured to propeller guards of the drone. In a drone with four propellers, there are four spaces between propeller guards, and a brace is secured via its ends to the two adjacent propeller guards at each space.

In another form of the invention, the antenna support, still a superstructure on the drone, has linear elements, such as a pair of inverted U shapes intersecting at top, in a rectangular or polygonal configuration, rather than arches. Other configurations can also be used.

It is an object of the invention to provide an efficient and rugged system for securing an RF antenna on a small sUAS or drone, the invention also encompassing a drone fitted with an antenna according to the invention. These and other objects, advantages and features of the invention will be apparent from the following description of a preferred embodiment, considered along with the accompanying drawings.

DESCRIPTION OF PREFERRED EMBODIMENTS

Figure 1:
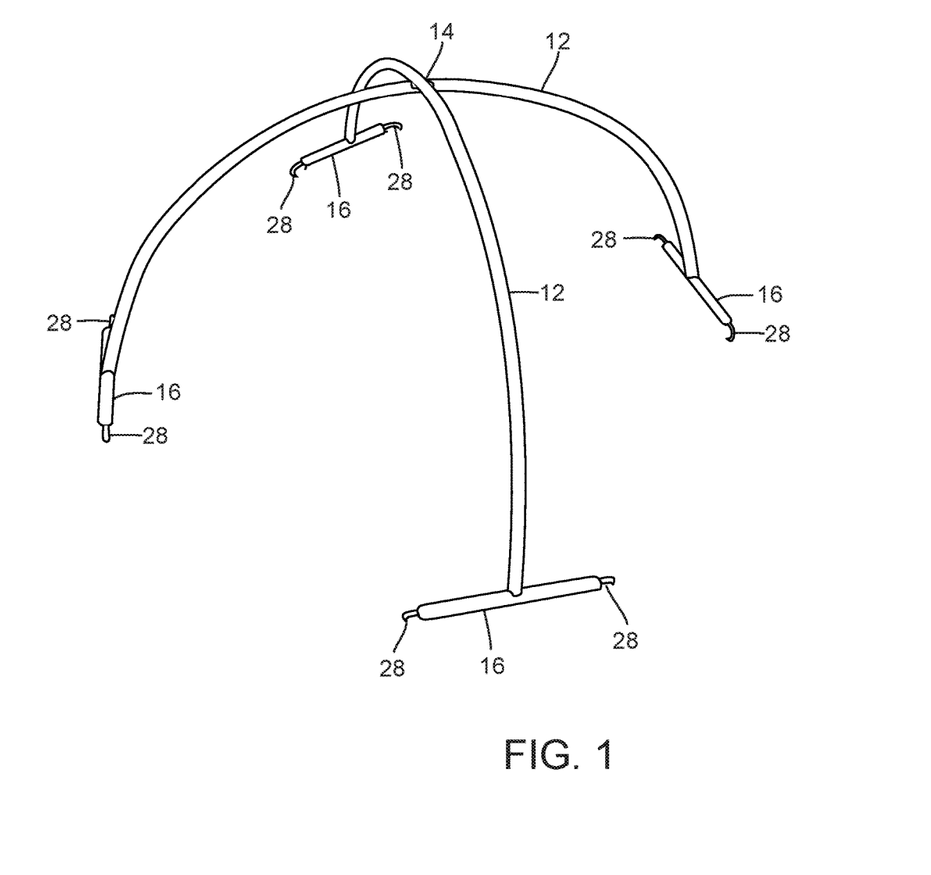
FIG. 1 is a schematic perspective view showing the antenna mounting apparatus of the invention, for attachment to a drone.
Figure 2:
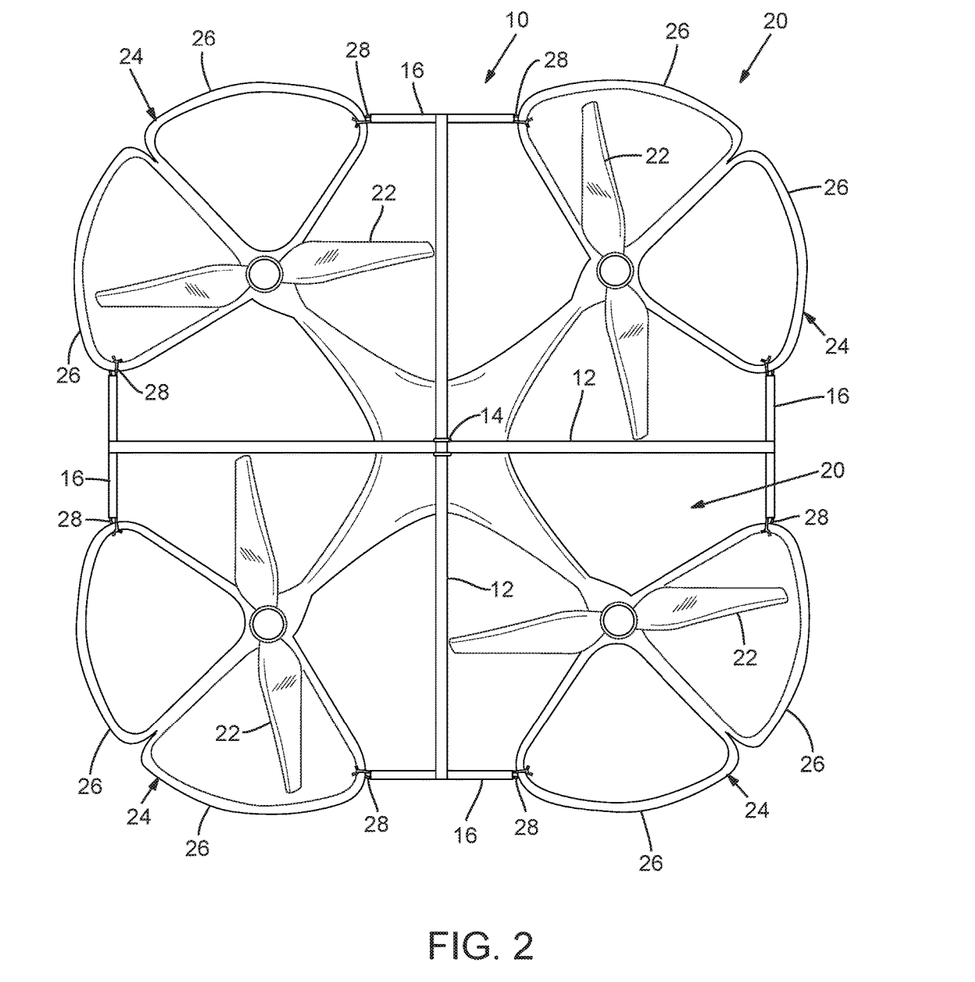
FIG. 2 is a top plan view showing a drone or sUAS incorporating the invention.

In the drawings, FIG. 1 schematically shows an antenna support structure or apparatus 10 of the invention. In this preferred embodiment the structure is formed of two intersecting arches 12 of dielectric material, i.e. plastic. These can be relatively thin rods, e.g. 3/16" to 1/4" in diameter. They could be hollow tubes if desired, for lighter weight. The two arches 12 are secured together at a central, uppermost point 14, in a right-angled intersection, the two arch elements lying in respective vertical planes as shown in FIGS. 1 and 2. At the end of each of the arches is a crossbar or brace 16, preferably (but not necessarily) of the same dielectric material. This could be integrally formed with the arch 12, or the components could be attached together, as by adhesive, heat bonding or suitable hardware that will not interfere with an antenna.

The drone shown in the drawings is, for example, is a Phantom-4 drone manufactured by DJI of China. This drone has a weight of about 3 pounds. It has no mounting facilities, or flat areas or structures to which a superstructure or antenna support could be attached in any practical sense. As can be seen in the drawings, the center of this Phantom drone, a typical drone, is somewhat rounded, and it contains electronics, including a GPS device and four motors. Four structural spokes or arms extend outwardly and, given the sweep of the propellers, leave no area for hardware or superstructure to be attached. The invention solves the problem of providing a supporting superstructure on such a typical consumer drone.

FIG. 2 shows in plan view a drone 20 fitted with the antenna support device 10 of the invention. The drone is of typical consumer drone size, weighing, for example, in the range of about 3 to 4 pounds. As is the drone model noted above, and as typical, the drone 20 includes four propellers 22, although a drone with a different number of propellers could be used. Also as typical, the drone 20 includes propeller guards 24 that extend radially outward relative to each propeller's rotation axis. Outer sections 26 of the propeller guards may extend upwardly to protect the adjacent propeller.

As seen in FIGS. 2 through 5, the crossbars or braces 16 of the antenna support structure 10 are secured by their ends to the propeller guards 26. The bars 16 extend between adjacent propeller guards. These connections 28 can be made by adhesive (such as a high-strength plastics glue) or simple mechanical connections. For example, the crossbars or braces 28 can have through holes, or tabs or buttons with through holes (not shown) for securing the ends of the crossbars to the propeller guard structure, at the nearest points as shown, using string or plastic ties, or plastic hardware such as plastic bolts and nuts or clamps. Alternatively, the end of each crossbar 16 could be formed into a yoke that fits over the propeller support structure of the drone, with threaded fasteners through holes near the ends of the yokes to enable clamping of each yoke onto the guard structure (yokes not shown).

In any event, the crossbars or braces 16 are firmly secured to the propeller guards, lodged in spaces between adjacent propeller guards, of which there are four in a four-propeller drone as shown, i.e. a typical consumer sUAS or drone.

Figure 3:
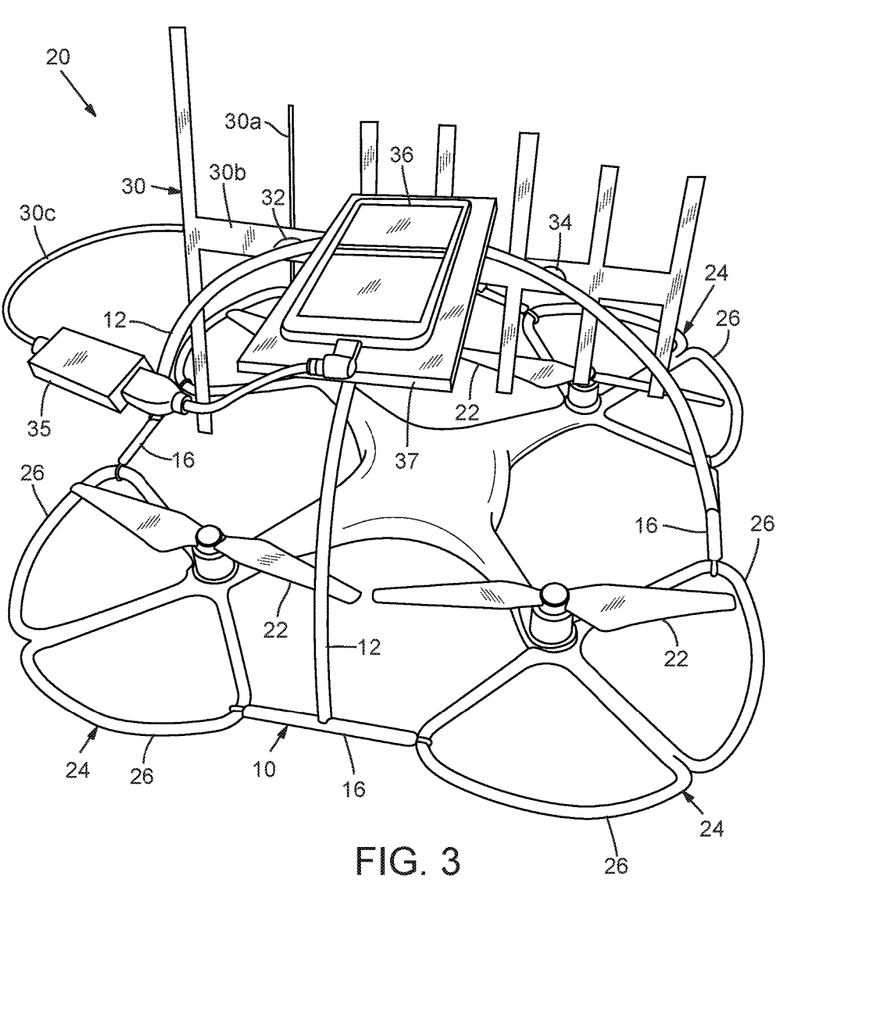
FIG. 3 is a perspective view showing the drone with the antenna support system of the invention attached, supporting an antenna and other connected equipment.
Figure 4:
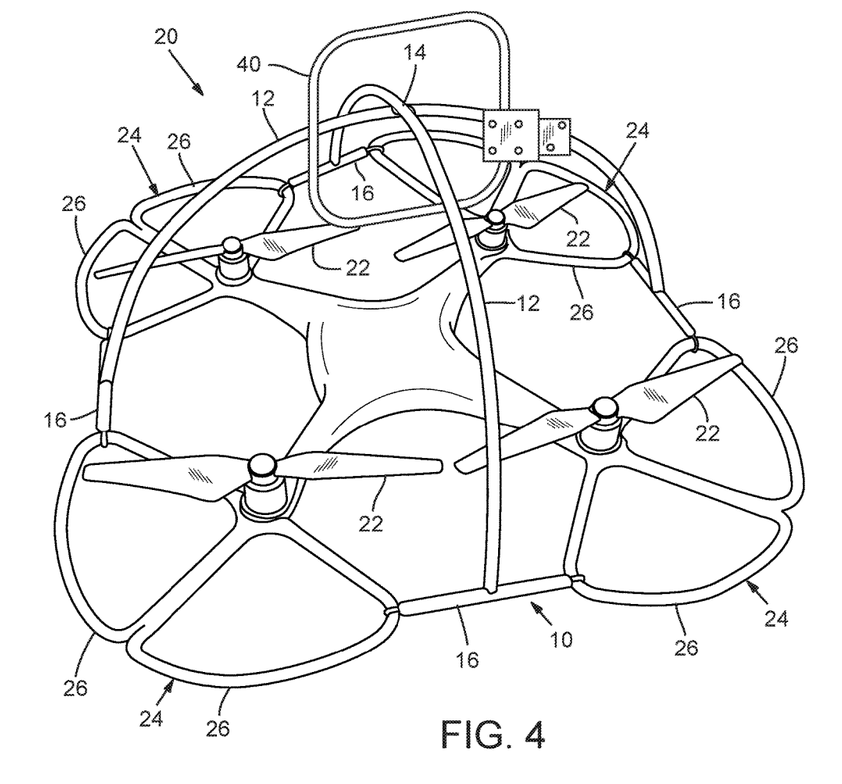
FIG. 4 is a perspective view showing a drone and the antenna support system, but with a different form of antenna carried by the support system.
Figure 5:
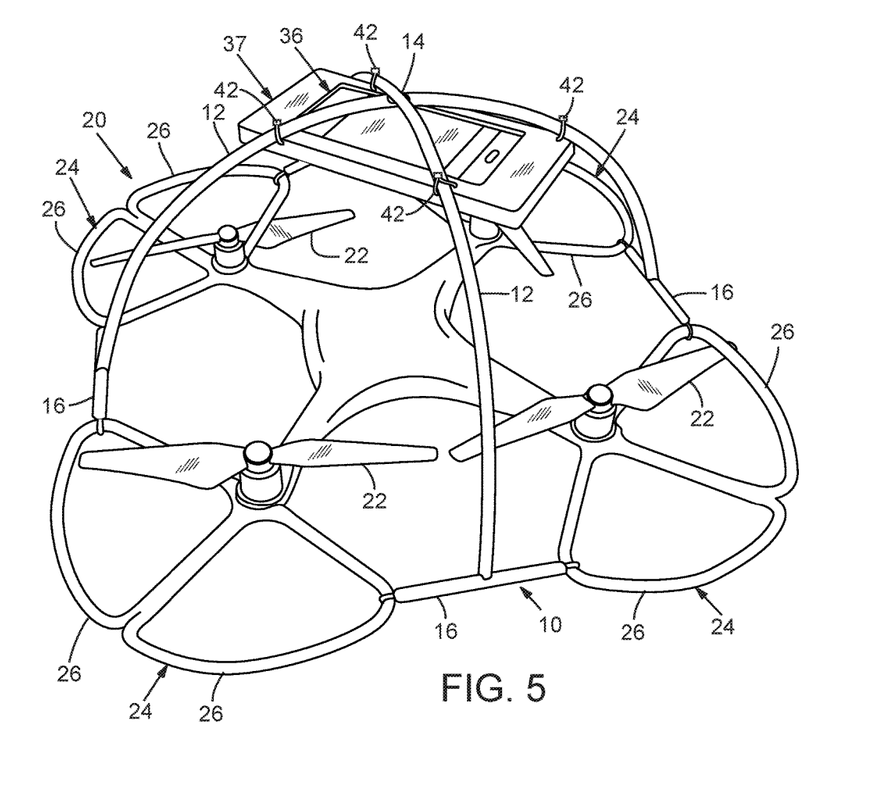
FIG. 5 is a perspective view showing a drone with the support structure, in this example carrying a smartphone.

FIGS. 3, 4 and 5 show the drone 20 in perspective, with the antenna support apparatus 10 carrying various antennas and apparatus. In FIG. 3 the support apparatus 10 carries a yagi antenna 30, which has a unique construction according to the invention. The yagi antenna 30 is formed of flat, thin sections of sheet metal (e.g. 16 to 22 gauge metal, preferably about 18 gauge (a lightweight metal such as aluminum)), and could be stamped out of a single sheet. In the illustrated antenna 30 one vertical element 30a of the antenna is a simple rod, which can be secured onto the main horizontal elongated antenna element 30b. Such an antenna design could be considered somewhat flimsy if used as a permanent structure, but it is adequate for attachment to a drone. Attachment points for the main horizontal element 30b are shown at 32 and 34 in the drawing. These connections could be via plastic ties or other plastic, dielectric hardware. FIG. 3 also shows the antenna 30 connected by a wire 30c to a receiver 35, which can be a USB RTL-SDR receiver, which is in turn connected to a smartphone 36 shown secured to one of the arch elements 12 via a mounting plate 37 that can be secured to one or both of the arch elements 12 using plastic ties or other connectors. The receiver 35 receives signals from the antenna and, with a software application in the smartphone 36, can analyze, display and record variations in signal strength as well as spectrum.

A person on the ground can communicate with the smartphone 36 via cellular system communication, to read the data from the ground or to record the data on a hand-held device. The smartphone can coordinate GPS position with signal strength or other data, for a desired number of different data points. The data points with GPS position (which can include altitude) can be recorded either on the smartphone, on the hand-held device used by the operator, or both.

FIG. 4 is a perspective view somewhat similar to that of FIG. 3, but showing the antenna support device 10 carrying a loop antenna 40. Again, the loop antenna 40 is of prescribed configuration for the specific RF signals to be sensed and measured. It can be held on one of the support arches 12 in the same way as described for the yagi antenna in FIG. 3. The loop antenna 40 must generally be in a vertical plane as shown.

FIG. 5 is a similar perspective view, in this case showing the support structure apparatus 10 secured on the drone in the same way but carrying only a smartphone 36, which can be borne on a smartphone carrying device 37. Such a smartphone platform or case 37 can have facilities such as holes for securing it to the arch elements, as by plastic ties indicated at 42. Other means of securement can be used. The smartphone 36 can be used to record via an application, or transmit to ground equipment, strength of signals received by the smartphone. This can provide information regarding signal strength of cell towers e.g. producing a map with a number of points indicating signal strength. The boundaries around a cell tower as to where a certain level of signal can be received, or where any signal at all can be received, can be defined in this way. Typically the smartphone will be in communication with the ground equipment via wi-fi through a hot spot on the smartphone.

The antenna support structure 10 could be in the form of a single plastic arch if it were secured on the drone sufficiently securely and rigidly. Additional features could be included on the support device, such as a built-on platform or vertical plate for various mountings. The use of two plastic arches 12, with a connection of the arches at the top intersection point 14, provides for a much more secure support framework and allows the components to be smaller and lighter in cross section. Note that on some drones it can be possible to utilize a single antenna support arch, but with tension lines of dielectric material connected to the high point of the arch and to crossbars or braces in the positions shown, between propeller guards.

The arch elements 12 are shown as defining about 180° of curvature, but this could be less, depending on the drone and what is to be supported. Each arch should define at least about 90° of curvature, preferably more, preferably at least 150° of curvature. As mentioned above, the antenna support structure could be of linear sections, such as intersecting inverted U shapes of dielectric material.

Figure 6:
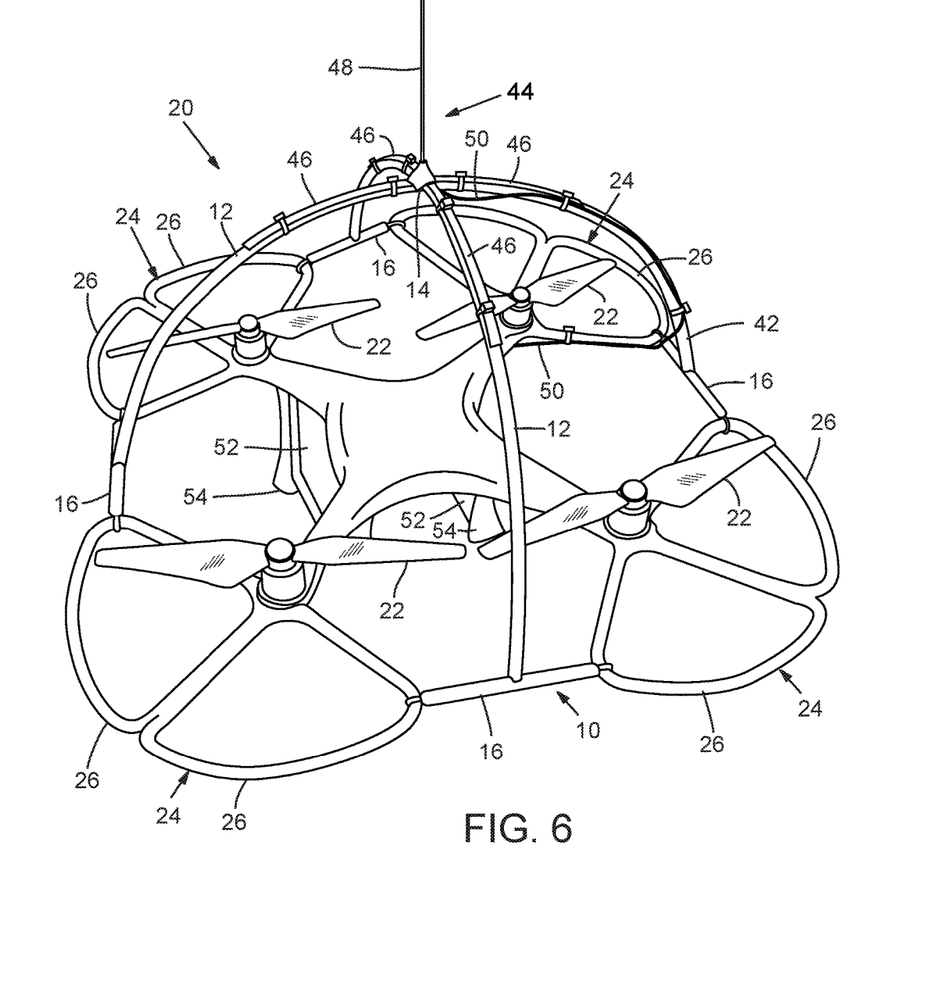
FIG. 6 is a perspective view similar to FIGS. 3 and 4 but showing another type of antenna secured to the drone.

In another application of the invention, as indicated in FIG. 6, the drone 20 can be used to test a receiving antenna, such as a newly installed receiving antenna on a tower or on the top of a water tank or other structure. Many of these antennas are put in place for public safety communications. A performance test for such an antenna is usually needed, to determine areas of interference from adjacent or nearby objects. For this purpose an omnidirectional antenna 44 is placed on the drone, secured to the arches 12 as shown. The omnidirectional antenna 44 has a ground plane of four radially extending legs 46, each of which is secured to an arch, as shown. From these extends an upright antenna component 48 whose length is determined by the frequency to be transmitted. The transmit antenna leads by a wire 50 to a signal generator (not shown) that can be secured under the center of the drone, at structure 52 and 54, some of which is seen in the drawing. The signal generator is powered by a battery, which can be the battery powering the drone itself.

The drone with the transmit antenna 44 is flown around an installed receiving antenna whose effectiveness is to be tested. It may be a directional receiving antenna, and the drone can be flown in all relevant regions and directions relative to the receiving antenna, at different levels, to test receive signal strength. The receiving antenna may be on a tower that has several other antennas, and the antenna must be tested to be sure the it will not be unduly hindered by interference. The signal received via the installed receiving antenna is monitored as the drone is flown around the vicinity, to provide the desired signal data. The antenna support structure 10 of the invention serves this purpose very well.

The antenna support apparatus 10 described above and shown in the drawings affords protection from damage to the drone by rising up into objects, such as tree branches, in addition to providing the function of supporting an antenna. Further, the antenna support structure 10 as shown can be used for picking up and carrying the drone. The support structure 10 has no components extending downwardly below the propeller guards 24 of the drone, and thus the antenna support does not pose any hindrance to landing of the drone.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A support structure as an accessory for a consumer drone, capable of securing a selected device to the upper side of a consumer drone, comprising: at least one arch element of dielectric material, comprising an inverted U-shaped narrow strip or bar of the dielectric material defining an arc or curve extending through at least 900, and the arch element having two ends, each end with a crossbar affixed to the arch element and extending horizontally in two opposed directions from the arch element, at right angles to the end of the arch element and being of sufficient length to extend horizontally between two adjacent propeller guards of a consumer drone, whereby the crossbars of the arch element on the support structure can be secured by their ends to propeller guards on a consumer drone, to provide an upwardly arching structure for securing a device to the drone, above the drone without interference with propellers or a GPS device of the drone.

2. The support structure of claim 1, including two said arch elements, secured together at an uppermost point at a right-angled intersection and the two arch elements lying in respective vertical planes at right angles to each other.

3. The support structure of claim 1, wherein the arch element extends through an arc or curve of at least 150°.

* * * * *

UNITED STATES PATENT AND TRADEMARK OFFICE
CERTIFICATE OF CORRECTION

| | | |
|---|---|---|
| PATENT NO. | : 10,063,328 B1 | Page 1 of 1 |
| APPLICATION NO. | : 15/608877 | |
| DATED | : August 28, 2018 | |
| INVENTOR(S) | : Thomas R. Brinkoetter | |

It is certified that error appears in the above-identified patent and that said Letters Patent is hereby corrected as shown below:

Claim 1:
Column 6, Line 7, replace the text "900" with "90°".

Signed and Sealed this
Thirtieth Day of October, 2018

Andrei Iancu
*Director of the United States Patent and Trademark Office*